(12) United States Patent
Allam et al.

(10) Patent No.: US 8,091,369 B2
(45) Date of Patent: Jan. 10, 2012

(54) METHOD AND APPARATUS FOR GENERATING ELECTRICAL POWER

(75) Inventors: Rodney John Allam, Chippenham (GB); Vincent White, Ashtead (GB); Julia Elizabeth Milligan, Leatherhead (GB)

(73) Assignee: Air Products and Chemicals, Inc., Allentown, PA (US)

( * ) Notice: Subject to any disclaimer, the term of this patent is extended or adjusted under 35 U.S.C. 154(b) by 851 days.

(21) Appl. No.: 12/171,699

(22) Filed: Jul. 11, 2008

(65) Prior Publication Data
US 2010/0007146 A1    Jan. 14, 2010

(51) Int. Cl.
*F22G 3/00*   (2006.01)

(52) U.S. Cl. .......................................... 60/772; 122/460

(58) Field of Classification Search .................... 60/772, 60/653, 39.182, 39.461; 122/1 B, 460, 483, 122/479.1, 467, 468
See application file for complete search history.

(56) References Cited

U.S. PATENT DOCUMENTS

| | | | |
|---|---|---|---|
| 4,272,953 A * | 6/1981 | Rice | 60/774 |
| 4,697,415 A * | 10/1987 | Schiffers | 60/39.12 |
| 5,361,377 A | 11/1994 | Miller | |
| 5,526,386 A * | 6/1996 | Tsiklauri et al. | 376/317 |
| 5,628,183 A * | 5/1997 | Rice | 60/39.182 |
| 5,724,805 A * | 3/1998 | Golomb et al. | 60/783 |
| 6,117,916 A * | 9/2000 | Allam et al. | 518/702 |
| 6,244,033 B1 | 6/2001 | Wylie | |

OTHER PUBLICATIONS

Dillon, D. J.,et al., "Oxy-Combustion Processes for CO2 Capture From Advanced Supercritical PF and NGCC Power Plant", presented a the 7th International Conference on Greenhouse Gas Control Technologies (GHGT-7), Vancouver, Canada, Sep. 2004.

Panesar, Ragi, et al., "Coal-Fired Advanced Supercritical Boiler / Turbine Retrofit with CO2 Capture", presented at Greenhouse Gas Control Technologies: Proceedings of the 8th International Conference (Jun. 19-22, 2006, Trondheim, Norway).

* cited by examiner

*Primary Examiner* — Ehud Gartenberg
*Assistant Examiner* — Vikansha Dwivedi
(74) *Attorney, Agent, or Firm* — Keith D. Gourley; Bryan C. Hoke, Jr.

(57) ABSTRACT

A superheater in a power plant that superheats steam to operation conditions exceeding an operating limit of an associated steam-producing boiler. The superheater combusts oxygen and fuel with cooled recycled combustion gas to produce a $CO_2$-rich combustion product gas stream at a fixed temperature. The combustion gas is used as the heat transfer fluid in the superheater's heat exchanger. The $CO_2$-rich flue gas stream allows for efficient capture of substantially pure $CO_2$. The superheater may be retrofitted to an existing power plant as a separate component, external to the boiler. The plant may thus have its electrical power output increased, while its overall $CO_2$ emissions per nit of generated power is decreased, even when inexpensive, readily-available fossil fuels are used as the primary fuel for filing the boiler and/or the superheater.

15 Claims, 6 Drawing Sheets

TABLE 1

| Stream Number | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Temperature | °C | 565.00 | 700.00 | 565.00 | 720.00 | 25.00 | 300.00 | 15.00 | 300.00 | 780.00 | 670.00 | 670.00 | 670.00 | 670.00 | 319.38 | 319.38 | 88.83 |
| Pressure | bar a | 166.00 | 165.50 | 40.20 | 39.70 | 41.00 | 41.00 | 41.00 | 41.00 | 41.00 | 40.00 | 40.00 | 41.00 | 40.00 | 1.10 | 1.10 | 1.10 |
| Flow | kg/s | 516.98 | 516.98 | 420.43 | 420.43 | 30.45 | 7.35 | 7.35 | 7.35 | 1808.64 | 1808.64 | 1770.84 | 1770.84 | 37.80 | 37.80 | 22.26 | 22.26 |
| Composition (mole) | | | | | | | | | | | | | | | | | |
| CO2 | mol% | 0.00 | 0.00 | 0.00 | 0.00 | 0.00 | 0.00 | 0.71 | 0.71 | 32.49 | 32.49 | 32.49 | 32.49 | 32.49 | 32.49 | 32.49 | 32.49 |
| N2 | mol% | 0.00 | 0.00 | 0.00 | 0.00 | 2.00 | 2.00 | 0.58 | 0.58 | 1.54 | 1.54 | 1.54 | 1.54 | 1.54 | 1.54 | 1.54 | 1.54 |
| O2 | mol% | 0.00 | 0.00 | 0.00 | 0.00 | 95.00 | 95.00 | 0.00 | 0.00 | 1.00 | 1.00 | 1.00 | 1.00 | 1.00 | 1.00 | 1.00 | 1.00 |
| AR | mol% | 0.00 | 0.00 | 0.00 | 0.00 | 3.00 | 3.00 | 0.00 | 0.00 | 2.04 | 2.04 | 2.04 | 2.04 | 2.04 | 2.04 | 2.04 | 2.04 |
| H2O | mol% | 100.00 | 100.00 | 100.00 | 100.00 | 0.00 | 0.00 | 0.00 | 0.00 | 62.92 | 62.92 | 62.92 | 62.92 | 62.92 | 62.92 | 62.92 | 62.92 |
| CH4 | mol% | 0.00 | 0.00 | 0.00 | 0.00 | 0.00 | 0.00 | 94.73 | 94.73 | 0.00 | 0.00 | 0.00 | 0.00 | 0.00 | 0.00 | 0.00 | 0.00 |
| C2H6 | mol% | 0.00 | 0.00 | 0.00 | 0.00 | 0.00 | 0.00 | 3.16 | 3.16 | 0.00 | 0.00 | 0.00 | 0.00 | 0.00 | 0.00 | 0.00 | 0.00 |
| C3H8 | mol% | 0.00 | 0.00 | 0.00 | 0.00 | 0.00 | 0.00 | 0.54 | 0.54 | 0.00 | 0.00 | 0.00 | 0.00 | 0.00 | 0.00 | 0.00 | 0.00 |
| C4H10 | mol% | 0.00 | 0.00 | 0.00 | 0.00 | 0.00 | 0.00 | 0.10 | 0.10 | 0.00 | 0.00 | 0.00 | 0.00 | 0.00 | 0.00 | 0.00 | 0.00 |
| iso C4H10 | mol% | 0.00 | 0.00 | 0.00 | 0.00 | 0.00 | 0.00 | 0.08 | 0.08 | 0.00 | 0.00 | 0.00 | 0.00 | 0.00 | 0.00 | 0.00 | 0.00 |
| C5H12 | mol% | 0.00 | 0.00 | 0.00 | 0.00 | 0.00 | 0.00 | 0.02 | 0.02 | 0.00 | 0.00 | 0.00 | 0.00 | 0.00 | 0.00 | 0.00 | 0.00 |
| iso C5H12 | mol% | 0.00 | 0.00 | 0.00 | 0.00 | 0.00 | 0.00 | 0.04 | 0.04 | 0.00 | 0.00 | 0.00 | 0.00 | 0.00 | 0.00 | 0.00 | 0.00 |
| C6H14 | mol% | 0.00 | 0.00 | 0.00 | 0.00 | 0.00 | 0.00 | 0.04 | 0.04 | 0.00 | 0.00 | 0.00 | 0.00 | 0.00 | 0.00 | 0.00 | 0.00 |

| Stream Number | | 17 | 18 | 19 | 20 | 21 | 22 | 23 | 24 | 25 | 26 | 27 |
|---|---|---|---|---|---|---|---|---|---|---|---|---|
| Temperature | °C | 319.38 | 88.83 | 88.83 | 40.00 | 30.00 | 30.00 | 30.00 | 30.00 | 80.00 | 20.00 | |
| Pressure | bar a | 1.10 | 1.10 | 1.10 | 1.10 | 1.10 | 1.10 | 1.10 | 15.00 | 15.00 | 4.00 | 4.00 |
| Flow | kg/s | 15.54 | 15.54 | 37.80 | 37.80 | 37.80 | 15.39 | 22.41 | 172.65 | 172.65 | 37.07 | 37.07 |
| Composition (mole) | | | | | | | | | | | | |
| CO2 | mol% | 32.49 | 32.49 | 32.49 | 32.49 | 32.49 | 0.05 | 84.19 | 0.00 | 0.00 | 0.00 | 0.00 |
| N2 | mol% | 1.54 | 1.54 | 1.54 | 1.54 | 1.54 | 0.00 | 4.00 | 0.00 | 0.00 | 0.00 | 0.00 |
| O2 | mol% | 1.00 | 1.00 | 1.00 | 1.00 | 1.00 | 0.00 | 2.59 | 0.00 | 0.00 | 0.00 | 0.00 |
| AR | mol% | 2.04 | 2.04 | 2.04 | 2.04 | 2.04 | 0.00 | 5.30 | 0.00 | 0.00 | 0.00 | 0.00 |
| H2O | mol% | 62.92 | 62.92 | 62.92 | 62.92 | 62.92 | 99.95 | 3.91 | 100.00 | 100.00 | 100.00 | 100.00 |

FIG.5

TABLE 2

| Stream Number | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Temperature | °C | 565.00 | 700.00 | 565.00 | 720.00 | 25.00 | 350.00 | 15.00 | 550.00 | 800.01 | 595.01 | 595.01 | 595.01 | 595.01 | 392.47 | 227.96 | 212.69 |
| Pressure | bar a | 166.00 | 165.50 | 40.20 | 39.70 | 41.00 | 41.00 | 41.00 | 41.00 | 41.00 | 40.00 | 40.00 | 41.00 | 40.00 | 40.00 | 40.00 | 40.00 |
| Flow | kg/s | 516.98 | 516.98 | 420.43 | 420.43 | 29.33 | 29.33 | 7.08 | 7.08 | 976.63 | 976.63 | 940.21 | 940.21 | 36.42 | 36.42 | 36.42 | 36.42 |
| Composition (mole) | | | | | | | | | | | | | | | | | |
| CO2 | mol% | 0.00 | 0.00 | 0.00 | 0.00 | 0.00 | 0.00 | 0.71 | 0.71 | 32.49 | 32.49 | 32.49 | 32.49 | 32.49 | 32.49 | 32.49 | 32.49 |
| N2 | mol% | 0.00 | 0.00 | 0.00 | 0.00 | 2.00 | 2.00 | 0.58 | 0.58 | 1.54 | 1.54 | 1.54 | 1.54 | 1.54 | 1.54 | 1.54 | 1.54 |
| O2 | mol% | 0.00 | 0.00 | 0.00 | 0.00 | 95.00 | 95.00 | 0.00 | 0.00 | 1.00 | 1.00 | 1.00 | 1.00 | 1.00 | 1.00 | 1.00 | 1.00 |
| AR | mol% | 0.00 | 0.00 | 0.00 | 0.00 | 3.00 | 3.00 | 0.00 | 0.00 | 2.04 | 2.04 | 2.04 | 2.04 | 2.04 | 2.04 | 2.04 | 2.04 |
| H2O | mol% | 100.00 | 100.00 | 100.00 | 100.00 | 0.00 | 0.00 | 94.73 | 94.73 | 62.92 | 62.92 | 62.92 | 62.92 | 62.92 | 62.92 | 62.92 | 62.92 |
| CH4 | mol% | 0.00 | 0.00 | 0.00 | 0.00 | 0.00 | 0.00 | 3.16 | 3.16 | 0.00 | 0.00 | 0.00 | 0.00 | 0.00 | 0.00 | 0.00 | 0.00 |
| C2H6 | mol% | 0.00 | 0.00 | 0.00 | 0.00 | 0.00 | 0.00 | 0.54 | 0.54 | 0.00 | 0.00 | 0.00 | 0.00 | 0.00 | 0.00 | 0.00 | 0.00 |
| C3H8 | mol% | 0.00 | 0.00 | 0.00 | 0.00 | 0.00 | 0.00 | 0.10 | 0.10 | 0.00 | 0.00 | 0.00 | 0.00 | 0.00 | 0.00 | 0.00 | 0.00 |
| C4H10 | mol% | 0.00 | 0.00 | 0.00 | 0.00 | 0.00 | 0.00 | 0.08 | 0.08 | 0.00 | 0.00 | 0.00 | 0.00 | 0.00 | 0.00 | 0.00 | 0.00 |
| iso C4H10 | mol% | 0.00 | 0.00 | 0.00 | 0.00 | 0.00 | 0.00 | 0.02 | 0.02 | 0.00 | 0.00 | 0.00 | 0.00 | 0.00 | 0.00 | 0.00 | 0.00 |
| C5H12 | mol% | 0.00 | 0.00 | 0.00 | 0.00 | 0.00 | 0.00 | 0.04 | 0.04 | 0.00 | 0.00 | 0.00 | 0.00 | 0.00 | 0.00 | 0.00 | 0.00 |
| iso C5H12 | mol% | 0.00 | 0.00 | 0.00 | 0.00 | 0.00 | 0.00 | 0.04 | 0.04 | 0.00 | 0.00 | 0.00 | 0.00 | 0.00 | 0.00 | 0.00 | 0.00 |
| C6H14 | mol% | 0.00 | 0.00 | 0.00 | 0.00 | 0.00 | 0.00 | 0.04 | 0.04 | 0.00 | 0.00 | 0.00 | 0.00 | 0.00 | 0.00 | 0.00 | 0.00 |

| Stream Number | | 17 | 18 | 19 | 20 | 21 | 22 | 23 | 24 | 25 | 26 |
|---|---|---|---|---|---|---|---|---|---|---|---|
| Temperature | °C | 40.00 | 30.00 | 30.00 | 30.00 | 162.00 | 213.00 | 30.00 | 120.00 | 20.00 | 30.00 |
| Pressure | bar a | 40.00 | 40.00 | 40.00 | 40.00 | 190.00 | 190.00 | 15.00 | 15.00 | 4.00 | 4.00 |
| Flow | kg/s | 36.42 | 36.42 | 15.72 | 20.70 | 41.54 | 41.54 | 92.43 | 92.43 | 22.71 | 22.71 |
| Composition (mole) | | | | | | | | | | | |
| CO2 | mol% | 32.49 | 32.49 | 1.47 | 87.18 | 0.00 | 0.00 | 0.00 | 0.00 | 0.00 | 0.00 |
| N2 | mol% | 1.54 | 1.54 | 0.00 | 4.26 | 0.00 | 0.00 | 0.00 | 0.00 | 0.00 | 0.00 |
| O2 | mol% | 1.00 | 1.00 | 0.00 | 2.76 | 0.00 | 0.00 | 0.00 | 0.00 | 0.00 | 0.00 |
| AR | mol% | 2.04 | 2.04 | 0.00 | 5.64 | 0.00 | 0.00 | 0.00 | 0.00 | 0.00 | 0.00 |
| H2O | mol% | 62.92 | 62.92 | 98.52 | 0.16 | 100.00 | 100.00 | 100.00 | 100.00 | 100.00 | 100.00 |

FIG.6

TABLE 3

| | | No Superheater | Superheater Option A | Superheater Option B | Superheater Option A without CO2 capture |
|---|---|---|---|---|---|
| Gross Power | MW | 531.4 | 735.2 | 737.0 | 735.2 |
| Aux Power | MW | 37.7 | 37.7 | 37.7 | 37.7 |
| ASU Power | MW | 0.0 | 24.1 | 23.2 | 24.1 |
| O2 Compression | MW | 0.0 | 13.3 | 12.8 | 13.3 |
| ASU Total | MW | 0.0 | 37.4 | 36.0 | 37.4 |
| CO2 Purification and Compression to 110 bar | MW | 0.0 | 9.2 | 1.7 | 0.0 |
| Superheater Expander Power | MW | 0.0 | -20.0 | 0.0 | -20.0 |
| Net Power | MW | 493.7 | 670.8 | 661.5 | 680.1 |
| Coal to PF boiler | MW | 1256.1 | 1256.1 | 1256.1 | 1256.1 |
| Fuel Gas to Superheater | MW | 0.0 | 356.0 | 342.9 | 356.0 |
| Efficiency (LHV) | % | 39.3 | 41.6 | 41.4 | 42.2 |
| Incremental Efficiency | % | n/a | 49.8 | 48.9 | 52.3 |
| CO2 Captured | tonne/h | 0 | 68.3 | 65.4 | 0.0 |
| CO2 Emitted | tonne/h | 422.3 | 425.5 | 423.7 | 493.7 |
| CO2 Avoided | tonne/h | 0 | 148.3 | 142.0 | 87.9 |

FIG. 7

METHOD AND APPARATUS FOR GENERATING ELECTRICAL POWER

BACKGROUND OF THE INVENTION

The present invention relates generally to generation of electrical power in stationary power plants. More specifically, the present invention provides a method and apparatus for production of electrical power with improved efficiency and/or improved capture of carbon dioxide.

Conventional methods of generation of electrical power in stationary power plants involves generation of high-pressure steam, and feeding of the steam to a steam turbine in which the steam pressure drops and the steam drives the turbine to generate electrical power. For example, a fossil-fuel fired boiler may be used to produce high-pressure superheated steam that is fed to an upstream steam turbine in a series train of turbines in which steam flows from higher pressure turbines to lower pressure turbines, all of which are connected to a drive shaft of an electrical generator for producing electrical power. Optionally the steam may be taken at an intermediate pressure and superheated in the fossil fuel fired boiler before returning to the train of steam turbines for further expansion.

Many existing power plants include coal-fired boilers, and use of coal-fired boilers is desirable in that a significant amount of the world's fossil fuel reserves exists as coal. Undesirably, $CO_2$ emissions per kWh of electricity production from a coal-fired power station are relatively high, and may be more than double that from a natural gas fuelled combined cycle power station. Further, $CO_2$ capture efforts to reduce undesirable $CO_2$ emissions reduce the efficiency of power plants and lead to higher power generation costs.

The amount of electrical power produced is a function of the temperature and pressure steam conditions of steam fed to the turbines. Increased temperature and pressure of the steam tends to increase electrical power production, and thus overall power production efficiency. However, the materials, etc. of turbines and boilers provide effective limits to the steam conditions for a given power plant. Although higher performance turbines and boilers may be available, the costs of such higher performance equipment are often excessive, particularly for high performance boilers. Additionally, there may be other problems in using such high-performance equipment. For example, for a conventional coal-fired steam boiler, there may be an operating limit of 600° C. at 300 bar pressure. To obtain significantly higher temperatures and pressures may require very costly super-alloys that are high in nickel content, which may result in problems from ash and slag deposition and corrosion. These alloys are not currently approved for use in steam boilers but they can be used in heat exchangers for superheating of steam. Accordingly, the boiler and/or turbine have operating limits that limit as a practical matter the amount of increased power production efficiency that may be obtained by increasing the temperature and pressure of the steam.

What is needed are a method and apparatus for obtaining steam at higher temperature and pressure (and thus increased power generation efficiency) without the need for expensive high-performance boilers, and for reducing $CO_2$ emissions per kWh of electricity produced, particularly for coal-fired power plants.

BRIEF SUMMARY OF THE INVENTION

Generally, the present invention provides a method and apparatus for generating electrical power from steam that involves superheating of steam streams in a superheater external to a main boiler. In accordance with the present invention, the superheater's heat transfer fluid is a $CO_2$-rich combustion product gas stream produced by burning a carbonaceous or hydrocarbon fuel in substantially-pure oxygen, and controlling temperature within the combustion chamber by recycling part of the combustion gases. The production of the $CO_2$-rich combustion product gas stream allows for capture of substantially pure $CO_2$ from the net combustion product gas following cooling, condensation and removal of liquid water. This results in increased power generation for a given $CO_2$ emission level or a reduced $CO_2$ emission level for a given amount of power generated (e.g., per kWh).

More specifically, an exemplary method for generating electrical power in a power plant having a boiler producing a steam stream fed to a steam turbine driving an electrical generator involves producing a pressurized high-pressure steam stream of steam at steam conditions below an operating limit of the boiler, producing a $CO_2$-rich combustion product gas stream by combustion of oxygen and fuel in an oxyfuel combustion process, the combustion product gas stream having a temperature higher than a respective temperature of the high pressure steam stream, heating the high-pressure steam stream from the boiler with the combustion product gas stream to produce a superheated high-pressure steam stream of steam at steam conditions above the operating limit of the boiler, and feeding the superheated high pressure steam stream to the steam turbine to drive the steam turbine to generate electrical power. Optionally an intermediate pressure steam stream can be taken from the discharge of one of the steam turbines and superheated first in the steam boiler and then in the external superheater before returning at a temperature above the operating limit of the boiler to the inlet of the next steam turbine. The method may further involve treating at least a portion of the combustion product gas stream exiting the heat exchanger to capture substantially pure $CO_2$.

Provided also is a power plant apparatus for generating electrical power that includes a boiler configured to receive boiler feedwater and to produce a pressurized high-pressure steam stream of steam at steam conditions below an operating limit of the boiler, a steam superheater external to the boiler, a first steam turbine having a steam inlet connected to the heat exchanger to receive the superheated high pressure steam stream, the first steam turbine expanding the superheated high-pressure steam stream to create a first expanded stream and to drive an electrical generator to generate electrical power, and a $CO_2$-capture system connected to the heat exchanger to cause at least a portion of the $CO_2$-rich combustion product gas stream exiting the heat exchanger to be conveyed to the $CO_2$-capture system, the $CO_2$-capture system being capable of treating the $CO_2$-rich combustion product gas stream and capturing purified $CO_2$. The steam superheater includes a combustor configured to combust oxygen and fuel in an oxyfuel combustion process to produce a $CO_2$-rich combustion product gas stream having a temperature higher than a respective temperature of the high-pressure steam stream, and a heat exchanger connected to the boiler and the combustor and configured to superheat the high-pressure steam stream received from the boiler with the combustion product gas stream received from the combustor to create a superheated steam stream, the superheated steam stream comprising steam at steam conditions above the operating limit of the boiler.

Provided also is a method for improving performance of an existing power plant including a boiler producing a steam stream fed via an inlet to a steam turbine that expands the steam stream to cause the steam turbine to drive a generator to generate electrical power. The method includes providing, external to the boiler, a steam superheater having a combustor configured to combust oxygen and fuel in an oxyfuel combustion process to produce a $CO_2$-rich combustion product gas stream having a temperature higher than a respective temperature of the boiler's steam stream, and a heat exchanger configured to receive an inlet stream and to superheat the inlet stream to create a superheated steam stream by transfer of heat from a heat transfer fluid stream, the heat exchanger being configured to superheat steam of the inlet stream to steam conditions above an operating limit of the boiler, the heat exchanger being connected to the combustor to receive the combustion product gas stream as the heat transfer fluid stream. The method further includes connecting the heat exchanger to the boiler to cause the heat exchanger to receive the boiler's steam stream as the inlet stream, providing a steam turbine with blades configured for steam conditions of the superheated steam stream, connecting the heat exchanger to the steam turbine's inlet to cause the steam turbine to receive the superheated steam stream to cause the steam turbine to drive the generator to generate electrical power, and connecting the heat exchanger to a $CO_2$-capture system to cause at least a portion of the $CO_2$-rich combustion product gas stream exiting the heat exchanger to be conveyed to the $CO_2$-capture system, the $CO_2$-capture system being capable of treating the $CO_2$-rich combustion product gas stream and capturing purified $CO_2$.

BRIEF DESCRIPTION OF SEVERAL VIEWS OF THE DRAWINGS

The present invention will now be described by way of example with reference to the following drawings in which:

FIG. 5 provides tabular representation of process conditions corresponding to Example 2 and FIG. 2;

FIG. 6 provides a tabular representation of process conditions corresponding to Example 3 and FIG. 3; and FIG. 7 is a tabular representation of data corresponding to Examples 1-3.

It should be noted that various pumps, heat exchangers, control valves, control systems, and other equipment that are necessary for practical and/or safe operation but are not required for understanding the present invention have been omitted from the figures for clarity of illustration, as will be understood by those skilled in the art.

The figures include pressures and temperatures at selected points that support the examples herein.

DETAILED DESCRIPTION OF THE INVENTION

The present invention provides a method and apparatus for generating electrical power from steam that involves superheating of steam streams in a superheater external to a main boiler, in which the superheater's heat transfer fluid is produced by combustion of oxygen and fuel in an oxyfuel combustion process. The oxyfuel combustion process allows for burning of carbonaceous (such as coal), hydrocarbon, or other readily available fuels that typically produce undesirably high levels of $CO_2$ emissions. Additionally, the oxyfuel combustion process produces a $CO_2$-rich combustion product gas stream, which allows for capture of substantially pure $CO_2$ from the oxyfuel combustion process gas stream. This results in increased power generation for a given $CO_2$ emission level, or a reduced $CO_2$ emission level for a given amount of power generated (e.g., per kWh).

Figure 1:
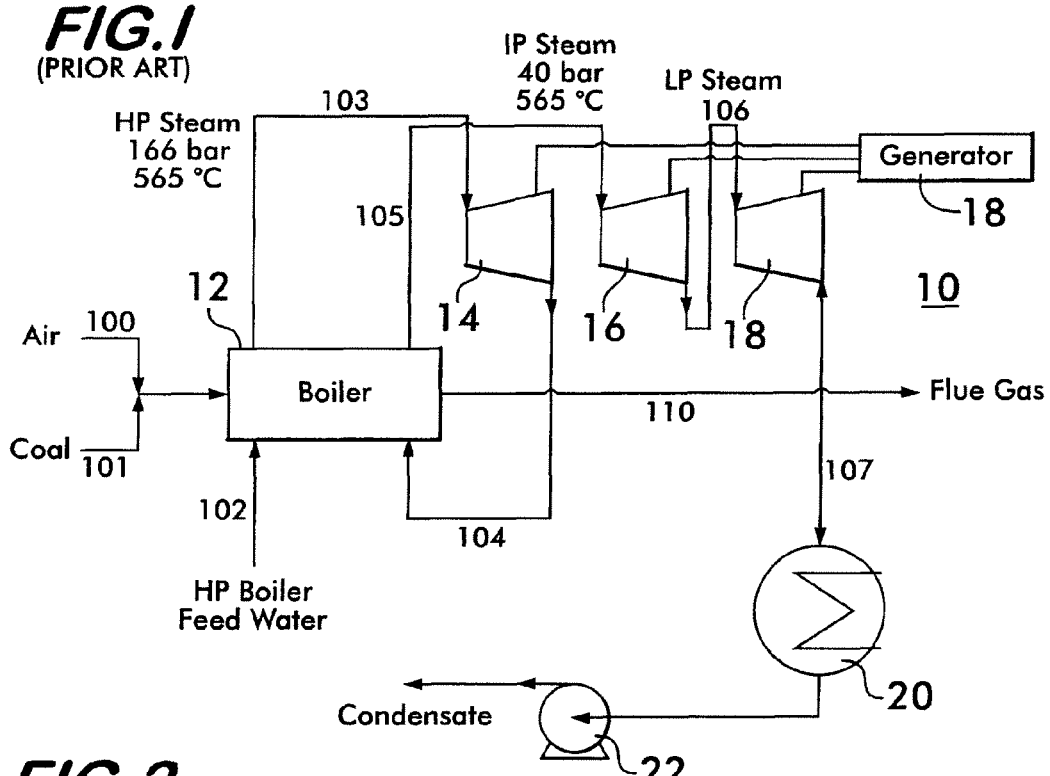
FIG. 1 is a schematic representation (flow sheet) of an exemplary conventional stationary power plant of the prior art.

FIG. 1 is a schematic representation (flow sheet) of an exemplary conventional stationary power plant 10 of the prior art, which includes a conventional boiler 12, which typically operates to produce steam at temperature and pressure conditions limited by the approved materials for boiler construction. At the time of this application, the limiting steam conditions are approximately 300 bar 600° C. The boiler 12 is fed a combustion air flow 100 and a fuel flow 101, and thus is fired to produce a high pressure steam stream 103 from a high-pressure boiler feed water stream 102. For example, the boiler 12 may be a pulverized coal fired boiler fed a fuel flow of pulverized coal. It should be noted that in certain embodiments, depending upon the boiler, the high-pressure steam stream exiting the boiler may include superheated steam.

The steam stream produced by the boiler 12 is fed to a steam turbine train that includes separate turbines connected to a shaft driving an electrical generator 18. In this example, the pressurized (high pressure) steam stream 103 is fed to a steam inlet of an appropriately-bladed high-pressure steam turbine 14 to drive the generator 18 to generate electrical power. The turbine 14 produces a first expanded steam stream 104 that is returned to the boiler for reheating. This first expanded steam stream 104 re-enters the boiler at reduced pressure and temperature, and is reheated to an elevated temperature to produce an intermediate-pressure (reheat) steam stream 105. The intermediate-pressure steam stream 105 is fed to a steam inlet of an appropriately-bladed intermediate-pressure steam turbine 16 to produce a second expanded steam stream (a low pressure steam stream) 106, and to drive the generator 18. The low pressure steam stream 106 is fed to the steam inlet of an appropriately-bladed low pressure steam turbine 18 to produce a third expanded steam (exhaust) stream 107, which is condensed in condenser 20 to produce a condensate stream. The condenser's cooling medium may be cooling water or ambient air, which condenses the steam to vacuum pressure. The condensate stream is pressurized by feedwater pump 22 and may be eventually combined into the high-pressure boiler feedwater stream 102 (not shown). It will be noted that the boiler 12 also produces a flue gas stream 110. While coal is a readily-available, relatively inexpensive fuel source, the combustion of coal results in undesirably-high levels of $CO_2$ in the flue gas stream, which contributes to environmental pollution.

It will be appreciated that boiler 12, as a typical conventional supercritical boiler, has temperature and pressure operating limits (ratings) of approximately 300 bar, 600° C./60 bar, 620° C., due to the construction and materials employed in such boilers. Thus, such boilers cannot be operated safely to produce a steam stream having pressures and temperatures above its operating limit. Generally, power generation efficiency will be increased by obtaining higher steam conditions of temperature and pressure, and such increased power generation efficiency also results in reduced $CO_2$ emissions per unit of electricity produced. However, the extent to which steam conditions may be increased to obtain increased power generation efficiency is limited by the temperature and pressure operating limits of the boiler.

EXAMPLE 1

With reference to FIG. 1 and the discussion above, the boiler 12 is fed a combustion air flow 100 and a pulverized coal flow 101, and is fired to produce a high pressure steam stream 103 at 166 bar, 565° C., which is fed to the high-pressure turbine 14. The expanded steam stream 104 exiting high-pressure turbine 14 re-enters the boiler 12 at 40 bar pressure and is reheated to produce an intermediate-pressure (reheat) steam stream 105 at 40 bar pressure, 565° C. The intermediate-pressure steam stream 105 is fed to the intermediate-pressure turbine 16 to produce a low pressure steam stream 106, which is fed to the low pressure steam turbine 18 to produce a third expanded steam (exhaust) stream 107 at 40 mbar. The turbines drive the generator 18 to produce 493.7 MW of net electrical power. For 1256.1 MW of coal supplied to the pulverized coal fired boiler, this provides an efficiency (LHV) of 39.3%, with 422.3 tonnes/hour of $CO_2$ emissions (see Table 3, No Superheater, FIG. 8).

Figure 2:
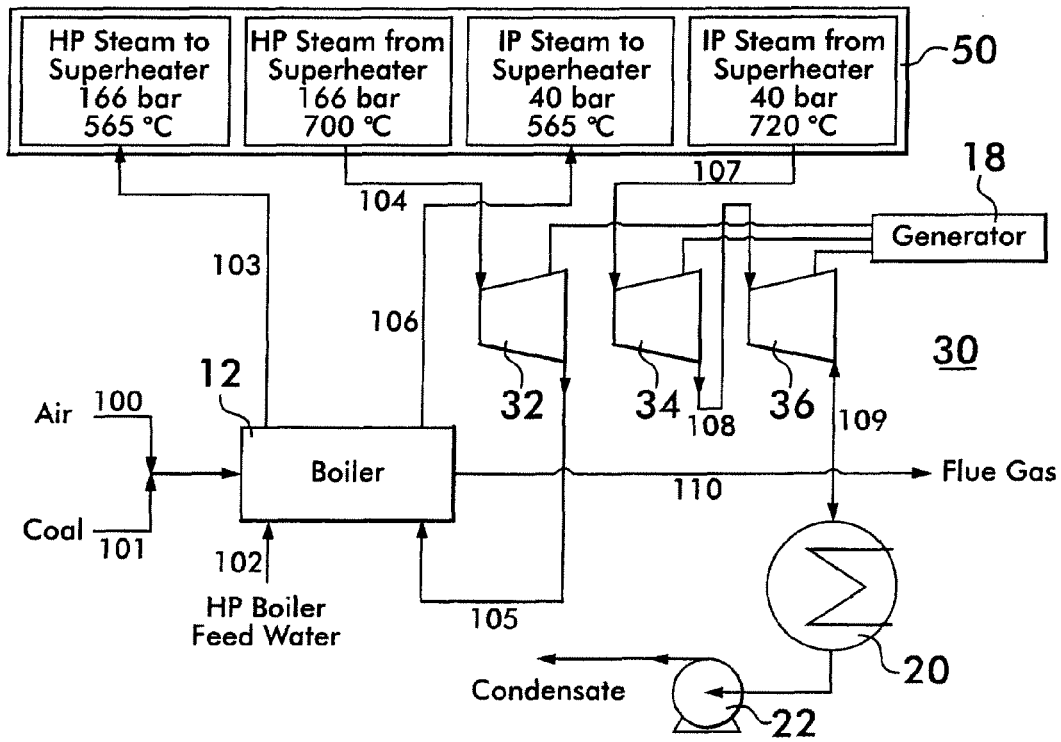
FIG. 2 is a schematic representation (flow sheet) of an exemplary stationary power plant in accordance with the present invention.

FIG. 2 is a schematic representation (flow sheet) of an exemplary stationary power plant apparatus 30 in accordance with the present invention. This power plant apparatus 30 for generating electrical power is similar to that shown in FIG. 1, in that it includes an identical boiler 12, condenser 20 and feedwater pump 22. Accordingly, the boiler 12 is configured to receive boiler feedwater and to produce a pressurized steam stream of steam at a temperature and pressure below the temperature and pressure operating limits, of the boiler.

Further, the power plant apparatus 30 may include similar (but not entirely identical) connections between various components, as will be appreciated from FIGS. 1 and 2. Unlike the exemplary conventional power plant 10 of FIG. 1, the power plant 30 of FIG. 2 includes a steam superheater 50 external to the boiler 12, for superheating steam streams from the boiler 12 to a temperature above the temperature operating limit of the boiler. The steam superheater is discussed in greater detail below with reference to FIG. 3.

Further, the power plant of FIG. 2 includes a turbine train similar to that of FIG. 1, but may include different turbines that are appropriate for the temperature and pressure conditions of the superheater-based power plant. It should be noted that an existing power plant may be converted to a power plant in accordance with the present invention with relatively minor modifications, including providing new turbines and/or retrofitting existing turbines with different blades appropriate for the steam conditions of the superheater-based power plant. In addition a larger electrical generator is required. Accordingly, by replacing/reconfiguring turbines of an existing turbine train, adding a superheater, and making related, relatively straightforward modifications, such as to increase electrical generation capacity to accommodate increased shaft power production from the steam turbines, an improved power plant may be obtained while retaining a substantial amount of the existing power plant, as discussed in greater detail below.

The power generation process for the power plant of FIG. 2 is generally similar to that of FIG. 1 discussed above. Unlike power generation for the power plant of FIG. 1, for the power plant of FIG. 2, the pressurized (relatively high-pressure) steam stream 103 exiting the boiler is fed as an inlet stream to the superheater 50, as discussed below with reference to FIG. 3. The superheater 50 heats the pressurized steam stream to a temperature above the temperature operating limit of the boiler to produce a superheated steam stream 104. The power plant apparatus 30 includes a first steam turbine 32 having a steam inlet connected to the heat exchanger 52 to receive the superheated high-pressure steam stream 104, the first steam turbine 32 expanding the superheated high-pressure steam stream 104 to create a first expanded stream 105 and to drive the electrical generator 18 to generate electrical power. The turbine 32 may be a new turbine, or the existing turbine fitted with appropriate blades, for the steam conditions of the superheated high pressure steam stream 104.

The first expanded stream 105 is fed to the boiler 12 to produce a reheated intermediate-pressure steam stream 106, which is fed as an inlet stream to the superheater 50. The superheater 50 reheats the intermediate-pressure steam stream 106 to steam conditions above the operating limit of the boiler 12 to produce a superheated intermediate-pressure steam stream 107. This superheated intermediate-pressure steam stream 107 is fed to a steam inlet of an appropriately-bladed intermediate pressure steam turbine 34, and then to an appropriately-bladed low pressure steam turbine 36 to drive the generator 18. The low pressure turbine's exhaust stream 109 is condensed and pressurized in a manner similar to that discussed above with reference to FIG. 1.

Accordingly, electrical power is generated at higher efficiency using steam at higher steam conditions, namely, at a temperature above the temperature operating limit of the boiler, and increased power generation is obtained. Further, this increased power generation is obtained without exceeding the temperature operating limit of the boiler.

Figure 3:
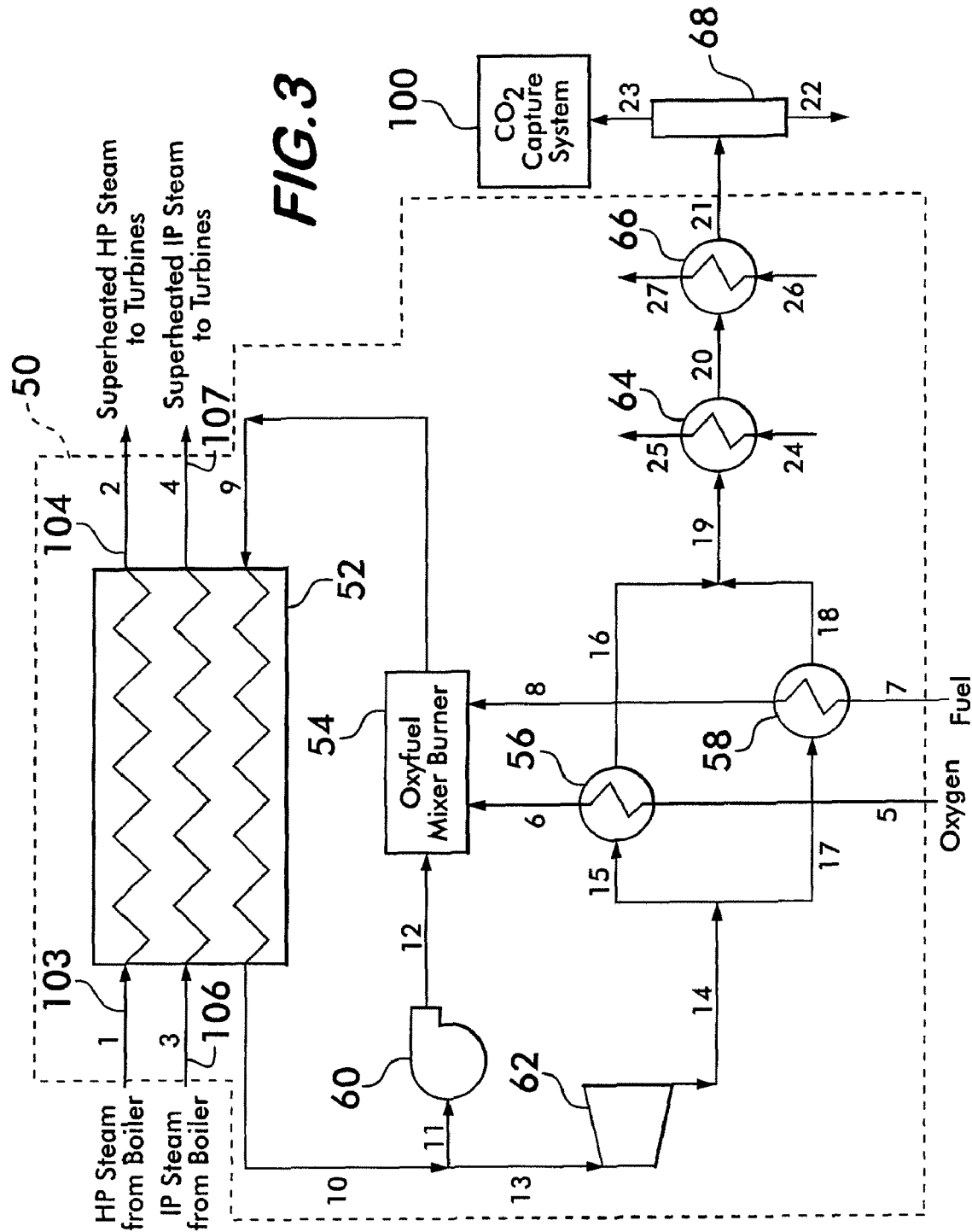
FIG. 3 is a schematic representation (flow sheet) of a superheater of the power plant of FIG. 2.

FIG. 3 is a schematic representation (flow sheet) of the superheater 50 of the power plant of FIG. 2. In accordance with the present invention, the steam superheater 50 includes a heat exchanger 52 for superheating inlet streams with a heat transfer fluid stream. More specifically, the heat exchanger 52 is connected to the boiler 12 and the combustor 54, and is configured to superheat the high-pressure steam stream 103, and optionally the intermediate-pressure steam stream 106, received from the boiler 12 by indirect heat exchange with the combustion product gas (flue gas) stream 9 received from the combustor 54 to create a corresponding superheated steam stream 104/107, the superheated steam stream comprising steam at steam conditions above the operating limit of the boiler 12. The heat exchanger 52 may be any one of a variety of suitable conventional, commercially available heat exchangers. By way of example, shell and tube and plate fin heat exchangers may be used for this purpose. A multi-stream, diffusion bonded, plate fin heat exchanger having high-temperature and high-pressure capabilities such as a diffusion-bonded high nickel alloy micro-channel heat exchanger accepting operating conditions of 350 bar at up to 800° C. is particularly well-suited for the purposes described herein. Suitable diffusion-bonded micro-channel heat exchangers are commercially available and suitable for this purpose. For example, a Heatric printed circuit diffusion bonded heat exchanger manufactured and/or sold by Heatric of Dorset, United Kingdom, may be employed for this purpose. Other types of heat exchangers may also be used for this purpose.

The oxyfuel combustor 54 is configured to produce a $CO_2$-rich combustion product gas stream containing little or no nitrogen diluent and having a temperature higher than a respective temperature of the high-pressure steam stream by burning a carbonaceous or hydrocarbon fuel in substantially pure oxygen with temperature controlled by recycle of part of the combustion gases. Oxygen at a purity from about 90 mol % to above about 99 mol % is suitable for this process. The oxyfuel combustor 54 may be a conventionally designed pressurized combustion device for gaseous, liquid or solid fuels. Oxyfuel combustors of a mixer/burner design are preferred, because such combustors have the ability to mix a recycled stream into the combustor, so that the resulting combustion product gas stream fed to the heat exchanger 52 may be regulated to maintain its temperature within the operating temperature limit of the heat exchanger 52. Preferably, the combustor 54 is configured to combust oxygen and fuel with cooled combustion gases recycled from the combustor 54 (streams 10, 11, 12), to regulate the temperature of the combustion product gas stream 9. As will be appreciated by those of ordinary skill in the art, if a solid fuel is used, there must be provision for ash particle removal from the heating gas stream 9.

Referring now to FIG. 3, the superheater 50 is discussed in greater detail. Process conditions are provided in Table 1 of FIG. 5. The oxyfuel combustor 54 is fed an oxygen flow 6 and a fuel flow 8. The oxygen flow 6 is preferably at 95% purity (95 mol % oxygen). The combustion process is preferably carried out at a pressure at or approaching the highest pressure possible, as limited by the combustor design, which may fall in the range of 10 bar to 150 bar. The oxygen and fuel inlet pressures are consistent with the combustion pressure chosen. The fuel inlet temperature is a function of fuel type and preheat available. The maximum oxygen feed temperature may be approximately 350° C. Oxygen is a suitable combustion medium because air combustion at pressures above 20 to 30 bar becomes very uneconomic due to the higher compression power compared to pressurized oxygen production and the additional complexity and cost of $CO_2$ capture. The fuel flow 8 may be any carbonaceous or hydrocarbon fuel, in gaseous, liquid or solid form. For example, the fuel may be supplied as gas derived from a coal partial oxidation gasification process, or a hydrocarbon partial oxidation gasification process, e.g. using a commercially available gasifier, as will be appreciated by those skilled in the art.

Accordingly, in contrast to conventional combustion of natural gas or other fuels in air, for which $CO_2$ emissions in the combustion product gas stream are typically relatively low at approximately 5%-10% by mole in composition (mol %), combustion of such carbonaceous or hydrocarbon fuels with substantially pure (e.g., greater than about 90 mol %) oxygen in an oxyfuel combustion process results in a $CO_2$-rich combustion product gas stream. As used herein, a "$CO_2$-rich" combustion product gas stream contains at least about 70 mol % $CO_2$ (dry basis), and more preferably, at least about 85 mol % $CO_2$ when using natural gas fuel as in the example. In this example, the oxygen and fuel flows 5, 7 are preheated by indirect heat exchange with the oxyfuel combustor's combustion product gas stream in heat exchangers 56, 58 to produce oxygen and fuel flows 6 and 8, as discussed in greater detail below.

Accordingly, the high-pressure steam stream 103 (exiting the boiler 12, FIG. 2) is fed to the superheater 50 (heat exchanger 52) as inlet stream 1 (FIG. 3), and intermediate-pressure steam stream 106 (exiting the boiler 12, FIG. 2) is fed to the superheater 50 (heat exchanger 52) as inlet stream 3 (FIG. 3), to produce superheated high-pressure steam stream 104 (entering the high pressure turbine 32, FIG. 2) and superheated intermediate-pressure steam stream 107 (entering the intermediate pressure turbine 34, FIG. 2) as outlet stream 2 and 4 (FIG. 3), respectively. These superheated streams are produced in the heat exchanger 52 by indirect heat exchange with the combustion product gas stream 9 fed from the oxyfuel combustor 54 to the heat exchanger 52 as the heat transfer fluid stream. The combustion product gas stream 9 is a mixed gas stream of combustion product flue gases and recycled, cooled combustion product gases. The combustion product gas stream is discharged from the heat exchanger at slightly lower pressure, and at lower temperature, as stream 10. This stream 10 is split into a recycled stream 11 and a net combustion product gas stream 13.

The recycled stream 11 is circulated through the oxyfuel combustor 54 by hot blower 60. Preferably the oxyfuel combustor 54 is configured as a two-stage device, in which part of the recycled stream 11/12 is admitted to a first stage of the combustor 54 to moderate the combustion temperature, and the remaining part of the recycled stream 11/12 is admitted to a second stage of the combustor 54, after combustion, to moderate the temperature of the combustion product gas stream 9 fed to the heat exchanger 52. Preferably, the oxyfuel combustion process is carried out at elevated pressure that is as high as practical, e.g. in excess of 40 bar, and preferably greater than 70 bar.

In the embodiment of FIG. 3, the net combustion product gas stream 13 is fed to an appropriately-bladed power producing expansion turbine 62, which is coupled to the drive shaft driving the generator 18 to produce electrical power. This turbine 62 discharges a lower pressure net combustion product gas stream 14. This stream 14 is cooled by indirect heat exchange in heat exchangers 56, 58 as it heats the oxygen and fuel flows 5, 7, and is further cooled by indirect heat exchange in water heater (heat exchanger) 64 as it heats condensate exiting feedwater pump 22 (FIG. 2), and is still further cooled by indirect heat exchange in water heater (heat exchanger) 66, as it heats cooling water.

The resulting cooled gas product stream 21 is then fed to a phase separation vessel 68, where it is separated into liquid (condensed) water that is removed as stream 22, and cooled gas product stream 23. Gas stream 23 is passed to a $CO_2$ capture system 100, where it can be treated to capture substantially pure $CO_2$, e.g. gas that contains at least about 95 mol % $CO_2$, which may be recovered from the net combustion gas product in the range 90-98%. A preferred $CO_2$ capture system compresses the gas, removes inert gases and $O_2$, and delivers substantially pure $CO_2$ at pipeline pressure of 110 bar or higher for disposal or other use.

Accordingly, the power plant apparatus 30 includes a $CO_2$-capture system 100 connected to the heat exchanger 52 to cause at least a portion of the $CO_2$-rich combustion product gas stream exiting the heat exchanger 52 to be conveyed to the $CO_2$-capture system, the $CO_2$-capture system being capable of treating the $CO_2$-rich combustion product gas stream and capturing purified $CO_2$.

Accordingly, the power plant of FIGS. 2 and 3 may be used in a method for generating electrical power in a power plant, in which the method involves producing a pressurized high-pressure steam stream of steam at steam conditions below an operating limit of the boiler, e.g. by passing preheated boiler feedwater through a boiler. The method may further include producing a $CO_2$-rich combustion product gas stream by combustion of oxygen and fuel in an oxyfuel combustion process, the combustion product gas stream having a temperature higher than a respective temperature of the high pressure steam stream, e.g., by combustion of oxygen and fuel in an oxyfuel combustor. The method may further include heating the high-pressure steam stream from the boiler with the combustion product gas stream to produce a superheated high-pressure steam stream of steam at steam conditions above the operating limit of the boiler, e.g., by passing the combustion product gas stream through a heat exchanger to superheat any inlet streams through the heat exchanger, and pass the high-pressure steam stream through the heat exchanger as an inlet stream. Further, the method may include feeding the superheated high pressure steam stream to the steam turbine to drive the steam turbine to generate electrical power, e.g., by feeding the superheated high-pressure steam stream to a steam inlet of a first turbine coupled to drive an electrical generator by expanding the stream. The oxyfuel combustion process is preferably carried out at an elevated pressure above atmospheric pressure. The method may further include treating, e.g. by purification and/or compression, at least a portion of the combustion product gas stream exiting the heat exchanger to capture substantially pure $CO_2$, e.g., by feeding at least apportion of the combustion product gas stream exiting the heat exchanger to a $CO_2$ capture system that treats the $CO_2$-rich combustion product gas stream and captures purified $CO_2$.

The plant may include a reheating/superheating loop, as discussed above. Accordingly, the method may further include heating a first expanded steam stream exiting the steam turbine to produce a pressurized intermediate-pressure steam stream of steam at steam conditions below the operating limit of the boiler, e.g., by passing the first expanded steam stream through the boiler. The method may further include heating the intermediate-pressure steam stream with the combustion product gas stream to produce a superheated intermediate-pressure steam stream at steam conditions above the operating limit of the boiler, e.g., by passing the intermediate-pressure steam stream into the heat exchanger as a second inlet stream. Further still, the method may include feeding the superheated intermediate-pressure steam stream to a second steam turbine coupled to drive the electrical generator, e.g., by feeding the superheated intermediate-pressure steam stream to a respective steam inlet of a second steam turbine coupled to drive an electrical generator. In a turbine train, the method may further include feeding the second expanded stream exiting the second steam turbine to a third steam turbine coupled to drive the electrical generator.

EXAMPLE 2

With reference to FIGS. 2 and 3, the high pressure steam stream 103 exiting the boiler is fed as an inlet stream to the superheater 50 at 166 bar, 565 C. The superheater 50 produces a superheated high-pressure steam stream 104 at 166 bar, 700° C. that is fed to high-pressure turbine 32. A the first expanded stream 105 exiting the turbine 32 is fed to the boiler 12 to produce an intermediate-pressure (reheat) steam stream 106 at 40 bar, 565° C. The superheater 50 reheats the intermediate-pressure steam stream 106 to steam conditions above the operating limit of the boiler to produce a superheated intermediate-pressure steam stream 107 at 40 bar, 720° C., which is fed to intermediate-pressure turbine 34, and then to low pressure turbine 36. A third expanded steam (exhaust) stream 109 exits the low pressure turbine 36 at 40 mbar. The low pressure turbine's exhaust stream 109 is condensed and pressurized in a manner similar to that discussed above with reference to FIG. 1.

The oxygen flow 6 fed to the oxyfuel combustor 54 is substantially pure, e.g. 95 mol % oxygen, and is supplied at 41 bar, 300° C. The fuel flow 8 fed to the oxyfuel combustor 54 is natural gas supplied at 41 bar, 300° C. the combustion product gas stream 9 is fed to the heat exchanger 52 at 41 bar, 780° C., and is discharged from the heat exchanger at 40 bar, 670° C. as stream 10. Temperature within the combustion chamber is controlled, to prevent damage to the heat exchanger 52, by recycling part of the combustion gases to the combustor 54. See streams 10, 11, 12. Turbine 62 discharges a lower pressure net combustion product gas stream 14 at 1.1 bar and 319.40° C. This stream 14 is cooled to about 89° C. as it heats the oxygen and fuel flows 5, 7, and is further cooled to about 40° C. as it heats condensate exiting feedwater pump 22 (FIG. 2), and thus preheats the boiler feedwater, and is still further cooled to about 30° C., as it heats cooling water. The resulting cooled gas product stream 21 has condensed water separated and removed as stream 22, and the resulting cooled gas product stream 23 containing approximately 84 mol % $CO_2$, is passed to the $CO_2$ capture system 100 for compression and purification treatment.

In this example, the turbines drive the generator 18 to produce 670.8 MW of net electrical power (see Option A, Table 3, FIG. 7). For 1256.1 MW of coal supplied to the pulverized coal fired boiler and 356.0 MW of fuel gas to supplied to the superheater, this provides an overall efficiency (LHV) of 41.6%, and an incremental efficiency of 49.8%. The increased power product and efficiency are achieved with an increase in $CO_2$ emissions of only 3.2 tonnes/hour, with a total $CO_2$ emission of 425.5 tonnes/hour. Notably, 148.3 tonnes/hour of $CO_2$ emissions are avoided (relative to the process described with respect to FIG. 1), and 68.3 tonnes/hour of $CO_2$ are captured. It will be appreciated that this captured $CO_2$ may be disposed of as desired, including storage or resale for industrial purposes. Additional data with respect to this example is provided in Tables 1 and 3 in FIGS. 5 and 7.

Figure 4:
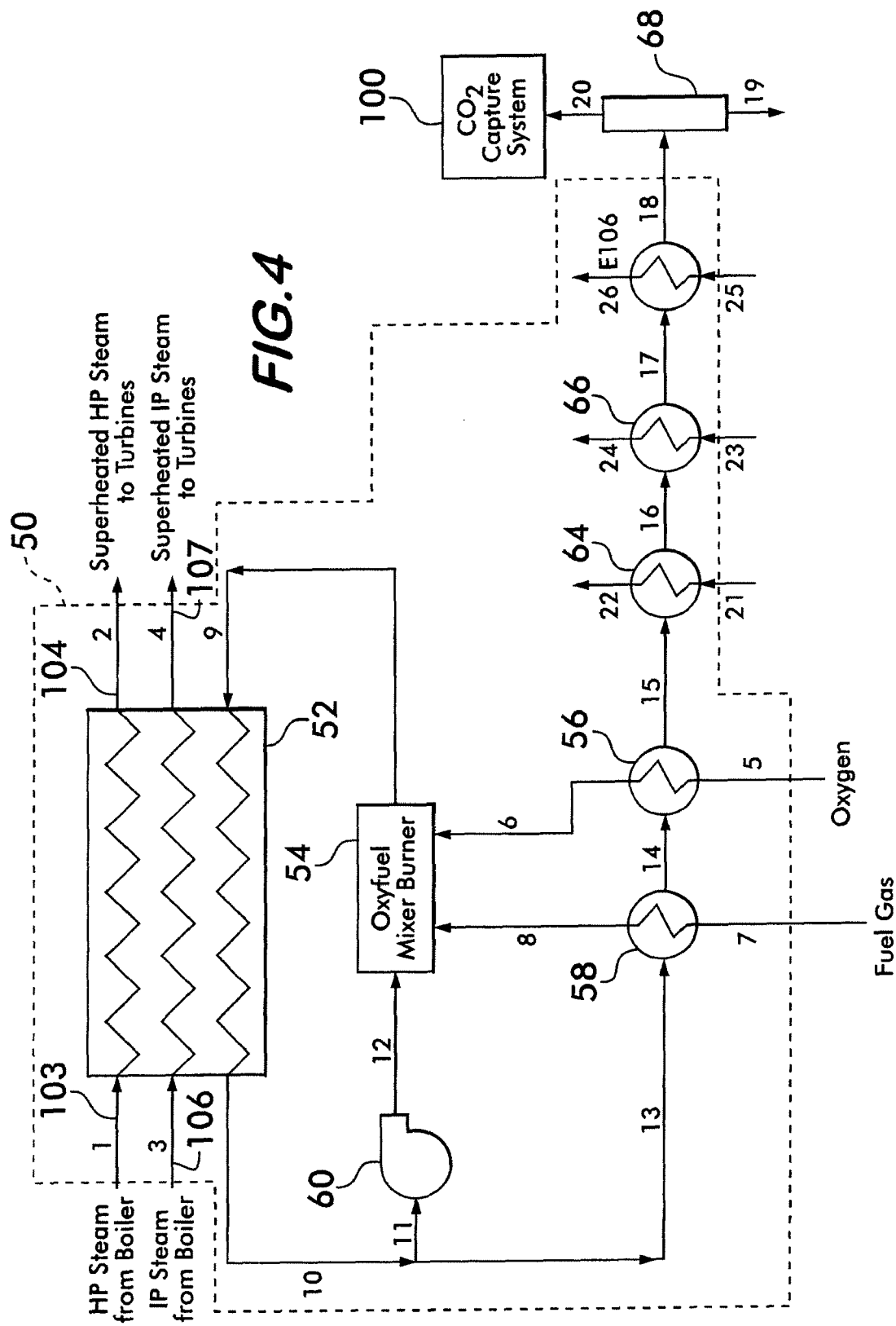
FIG. 4 is a schematic representation (flow sheet) of an exemplary alternative superheater in accordance with the present invention.

FIG. 4 is a schematic representation (flow sheet) of an exemplary alternative superheater in accordance with the present invention. The superheater of FIG. 4 is similar to that of FIG. 3, as will be appreciated from FIG. 3 and from the process conditions given in Table 2 of FIG. 6. Unlike the superheater of FIG. 3, the superheater of FIG. 4 eliminates expansion turbine 62. This allows a higher pressure to be maintained in the net combustion product gas stream 13, and eventually in the stream 20 fed to the $CO_2$ capture system 100. Relative to FIG. 3, this configuration eliminates the expansion turbine 62 and lower pressure $CO_2$ compressor, and thus simplifies and reduces the capital cost of the superheater. Surprisingly, this also results in only very minor changes in electrical power production and overall thermal efficiency, as shown in the example of Table 3.

EXAMPLE 3

With reference to FIGS. 2 and 4, the high pressure steam stream 103 exiting the boiler is fed as an inlet stream to the superheater 50 at 166 bar, 565° C. The superheater 50 produces a superheated high pressure steam stream 104 at 166 bar, 700° C. The boiler reheats the first expanded stream 105 to produce an intermediate pressure (reheat) steam stream 106 at 40 bar, 565° C. The superheater 50 reheats the intermediate pressure steam stream to steam conditions above the operating limit of the boiler to produce a superheated intermediate pressure steam stream 107 at 40 bar, 720° C., which is fed to intermediate-pressure turbine 34, and then to low pressure turbine 36. A third expanded steam (exhaust) stream 109 exits the low pressure turbine 36 at 40 mbar. The low pressure turbine's exhaust stream 109 is condensed and pressurized in a manner similar to that discussed above with reference to FIG. 1.

The oxygen flow 6 fed to the oxyfuel combustor 54 is of 95 mol % oxygen, and is supplied at 41 bar, 350° C. The fuel flow 8 fed to the oxyfuel combustor 54 is natural gas supplied at 41 bar and 550° C. The combustion product gas stream 9 is fed to the heat exchanger 52 at 41 bar, 800° C., and is discharged from the heat exchanger at 40 bar, 595° C. as stream 10. Net combustion product gas stream 13 is cooled to about 392° C. as it heats the fuel flow 7, is further cooled to about 228° C. as it heats the oxygen flow 5, is further cooled to about 213° C.

as it heats boiler feed water exiting feedwater pump 22 (FIG. 2), is still further cooled to about 40° C. as it heats condensate from the steam condenser, and is further cooled to about 30° C. by indirect heat exchange with cooling water. The resulting cooled gas product stream 18 has condensed water separated and removed as stream 19, and the resulting cooled gas product stream 20 containing approximately 87 mol % $CO_2$, is passed to the $CO_2$ capture system 100 for treatment by compression and purification.

In this example, the turbines drive the generator 18 to produce 661.5 MW of net electrical power (see Option B, Table 3, FIG. 7). For 1256.1 MW of coal supplied to the pulverized coal fired boiler and 342.9 MW of fuel gas to supplied to the superheater, this provides an overall efficiency (LHV) of 41.4%, and an incremental efficiency of 48.9%. The increased power product and efficiency are achieved with an increase in $CO_2$ emissions of only 1.4 tonnes/hour, with a total $CO_2$ emission of 423.7 tonnes/hour (relative to the process described with respect to FIG. 1). Notably, 142.0 tonnes/hour of $CO_2$ emissions are avoided (relative to the process described with respect to FIG. 1), and 65.4 tonnes/hour of $CO_2$ are captured. It will be appreciated that this captured $CO_2$ may be disposed of as desired, including storage or resale for industrial purposes. Additional data with respect to this example is provided in Tables 2 and 3 in FIGS. 6 and 7.

Accordingly, as shown in Table 3, an exemplary power station produces 493.7 MW of electrical power at an efficiency of 39.3% (LHV). Adding a superheater fired by natural gas (without $CO_2$ capture) provides an incremental 186.4 MW electrical power at an efficiency of 42.2% overall, and 52.3% for the natural gas increment. This system is convertible to a system providing $CO_2$ capture ready. To provide for $CO_2$ capture requires that $CO_2$ compression and purification units be added to capture $CO_2$ from the $CO_2$-rich combustion product gas stream.

An exemplary addition of a $CO_2$ capture system including $CO_2$ purification and compression to 110 bar pipeline pressure, based on a scenario omitting the expansion turbine 62, gives an incremental 167.8 MW of electrical power and an efficiency for natural gas consumption of 48.9%, as shown in Table 3. This compares favorably to current technological alternatives involving converting natural gas to $H_2+CO_2$ by catalytic steam reforming or autothermal reforming followed by amine solvent $CO_2$ removal, and combustion of the hydrogen in a gas turbine combined cycle power generation system, which generally yields efficiencies in the range of 44% to 47%. Additionally, this exemplary superheater-based system is believed to have an advantage in simplicity and lower capital costs.

It should be noted that in an alternative embodiment of a stationary power plant, the steam boilers are heated by a nuclear reactor, in accordance with the present invention. In such an embodiment, a pressurized water reactor is used as the boiler 12 of FIG. 2 to generate steam at relatively low temperature and pressure. A Westinghouse 1300 MWe 4 loop reactor generates steam at 71.6 bar, 289° C. The net efficiency for heat conversion to electric power is only 33.9% (not including cooling water and site transmission losses). The use of the superheater defined in FIG. 3 with steam at 71.6 bar superheated to 600° C. and steam at 20.7 bar superheated to 600° C. would increase the net power to 3105 MWe (allowing for oxygen production, $CO_2$ purification and $CO_2$ compression to 200 bar but not including cooling water or transmission losses). The process would require 23,455 tonne/day oxygen and 3008 MW (LHV) of natural gas fuel for the oxyfuel combustion. The overall efficiency (nuclear+natural gas heat) is 45.4% while the incremental power, measured against the natural gas heat, has an efficiency of 60%.

As referred to above, various different fuels may be used to fire the oxyfuel combustor 54. By way of example, in certain embodiments a coal gasifier may be used to produce a suitable fuel gas for use in substitution for the natural gas identified in the example above. For example, a commercially available Shell or Uhde gasifier of the dry entrained flow type may be used for this purpose or coal/water slurry feed gasifiers such as the GE or the ConocoPhilips gasifier. For the dry feed types it may be desirable to filter out entrained ash particles from the fuel gas that might occlude micro-channels, etc. of the heat exchanger. A suitable filter medium, such as ceramic candles maintained at 400° C. to 500° C., may be used for this purpose. This may require the gasifier exit gas to be cooled, e.g., in a waste heat boiler, before passing it to the combustor 54. It may be advantageous to generate a pressurized steam stream in the waste heat boiler, and optionally superheat this stream, before feeding it to the main boiler system, e.g. to mix with the intermediate-pressure stream leaving the high pressure turbine. In such an embodiment, the two saturated intermediate-pressure steam streams may be mixed, and the combined stream is reheated in the boiler 12, and then superheated in the superheater 50.

It should be noted that no shift conversion or selective $H_2S$ removal system is required for the gasifier product stream, as is normally required for a coal gasification combined cycle gas turbine system generating electrical power. Accordingly, in embodiments including a fossil fuel gasifier, the fuel received from the gasifier includes any $H_2S$ and COS derived from the gasification process, and the heat of combustion of the $H_2S$ and COS is advantageously available for superheating of steam. Thus, it is preferable that the fuel is not cooled below its normal exit temperature from the hot gas filter of the gasifier, nor should it be subjected to any selective $H_2S$ removal, catalytic COS hydrolysis, or any other impurity removal process. Additionally, in appropriate embodiments, the fuel received from the gasifier may include any steam from the gasification process and any subsequent water quenching process, so that the heat of such steam is advantageously available for superheating of steam. Further, the net flue gas product following combustion will be in an oxidizing environment. Accordingly, the $H_2S$ and COS present in the fuel gas stream from the coal, bitumen or petcoke gasifier will have been combusted, yielding $SO_2$, $SO_3$, $CO_2$ and $H_2O$ in the combustion product (flue) gas stream. The flue gas stream will also contain other gaseous impurities derived from the coal feed in an oxidized state. This flue gas is mostly $CO_2$, with excess $O_2$ and a relatively small amount of $N_2+Ar$ derived from impurities in the oxygen, or from the coal feed. Advantageously, the flue gas will contain very little NOx because of the recycle of flue gas to control the combustion product gas stream exit temperature from the oxyfuel burner and the low concentration of $N_2$ in the recycle gas stream.

It will be noted that it is desirable to carry out the coal gasification and subsequent oxyfuel combustion at as high a pressure as is practical. Maintenance of the fuel flow at relative high pressure enhances power recovery and reduces the volumetric flow of the oxyfuel heat transfer gas passing through the superheater/heat exchanger.

It should be noted that in embodiments deriving fuel from a coal gasifier, a single, appropriately-sized gasifier may provide enough fuel gas to supply a plurality of separate steam boilers, each of which is associated with a corresponding superheater in accordance with the present invention. Due to the lower availability of the coal gasifier come up as compared with a pulverize coal-fired boiler, it may be necessary in such embodiments to provide a secondary fuel stream that could be instantly available to maintain the operation of the superheater in the event that enough fuel is not being supplied presently by the coal gasifier. In such an embodiment, the oxyfuel combustor is specially-configured with a dual fuel firing capability. Combustors having dual-fuel firing capability are commercially available and well known in the art. By way of example, natural gas or liquid hydrocarbon fuel may be used as a secondary fuel. It may be advantageous to use the secondary fuel during startup operations, or during planned maintenance of the gasifier system.

It should be appreciated that, consistent with the present invention, a superheater may be added to an existing electrical power generating power plant including an existing coal-fired, nuclear, or other, boiler that is designed for current steam conditions. Accordingly, the power generation performance of the power plant may be improved. Additionally, firing of the superheater by combustion of oxygen in an oxyfuel combustor in accordance with the present invention, allows for burning carbonaceous or hydrocarbon fuels to produce a $CO_2$ rich combustion product gas stream well-suited to $CO_2$ capture by a $CO_2$ capture system. Due to capture of the $CO_2$ from the oxyfuel combustor's combustion product gas stream, in accordance with the present invention, there is no significant increase $CO_2$ emission for the power plant. Accordingly, the power plant's power production is increased, and its $CO_2$ emission per kWh is reduced.

As will be apparent from the discussion above, a method for improving performance of an existing power plant for generating electrical power includes providing a steam superheater external to the boiler. As described above, the superheater includes a combustor configured to combust oxygen and fuel in an oxyfuel combustion process to produce a $CO_2$-rich combustion product gas stream having a temperature higher than a respective temperature of the power plant's boiler's steam stream. The superheater further includes a heat exchanger configured to receive an inlet stream and to superheat the inlet stream to create a superheated steam stream by transfer of heat from a heat transfer fluid stream. The heat exchanger is configured to superheat steam of the inlet stream to steam conditions above an operating limit of the boiler. The heat exchanger is connected to the combustor to receive the combustion product gas stream as the heat transfer fluid stream. The method further includes connecting the heat exchanger to the boiler to cause the heat exchanger to receive the boiler's steam stream as the inlet stream.

Changes may need to be made to the turbines of the turbine train due to the change in the steam conditions entering the turbine train. Accordingly, the method further includes providing a steam turbine with blades configured for steam conditions of the superheated steam stream. This may involve providing a new steam turbine, appropriately-sized and bladed, in substitution for a respective one of the power plant's existing turbines. Alternatively, this may involve only replacing blades of the power plant's existing steam turbine with new blades configured for steam conditions of the superheated steam stream. In a power plant having high-pressure, intermediate-pressure and low-pressure turbines (as in FIGS. 2 and 3), it may be appropriate to substitute a new high-pressure turbine for the existing high-pressure turbine, and may be suitable to reblade the intermediate-pressure and low-pressure turbines.

The method further includes connecting the heat exchanger to the steam turbine's inlet, e.g. in a turbine train, to cause the steam turbine to receive the superheated steam stream to cause the steam turbine to drive the generator to generate electrical power. Further, the method includes connecting the heat exchanger to a $CO_2$-capture system to cause at least a portion of the $CO_2$-rich combustion product gas stream exiting the heat exchanger to be conveyed to the $CO_2$-capture system, the $CO_2$-capture system being capable of treating the $CO_2$-rich combustion product gas stream and capturing purified $CO_2$.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method for generating electrical power, the method comprising:
   heating water in a boiler to produce a pressurized stream of steam at a first temperature and a first pressure below temperature and pressure operating limits of the boiler;
   combusting substantially-pure oxygen and fuel to produce a combustion product gas stream having a respective temperature higher than the first temperature of the pressurized steam stream, the respective temperature being controlled to remain below a limit for a heat exchanger by addition of a cooled portion of the combustion product gas stream;
   heating the pressurized steam stream by indirect heat exchange with the combustion product gas stream in the heat exchanger to produce a superheated pressurized stream of steam at a second temperature above the temperature operating limit of the boiler; and
   generating electrical power by passing the superheated pressurized steam stream through a steam turbine driving an electrical generator.

2. The method of claim 1 wherein the substantially-pure oxygen comprises oxygen having a purity greater than 90 mol %.

3. The method of claim 1, further comprising treating at least a portion of the combustion product gas stream to capture substantially pure $CO_2$.

4. The method of claim 1, wherein the boiler is heated by a process selected from the group consisting of burning pulverized coal and nuclear fission.

5. The method of claim 1, wherein the pressurized steam stream is heated in a diffusion-bonded high nickel alloy micro-channel heat exchanger, and wherein the fuel is selected from the group consisting of carbonaceous fuel in one of gaseous, liquid and solid forms, hydrocarbon fuel in one of gaseous, liquid and solid forms, gas derived by coal partial oxidation gasification, gas derived by hydrocarbon partial oxidation gasification, gas from a fossil fuel gasifier which includes steam resulting from gasification and any subsequent water quenching, gas from a fossil fuel gasifier which includes $H_2S$ and COS resulting from gasification, and combinations thereof.

6. The method of claim 1, wherein the combustion product gas stream comprises at least about 70 mol % $CO_2$ on a dry basis.

7. The method of claim 1, wherein at least a portion of the combustion product gas stream exiting the heat exchanger is passed to a preheater to preheat the water.

8. The method of claim 1, further comprising expanding at least a portion of the combustion product gas stream exiting the heat exchanger in an expansion turbine connected to the electrical generator, the expansion turbine discharging an exhaust stream at approximately atmospheric pressure.

9. The method of claim 8, further comprising preheating water fed to the boiler by indirect heat exchange with the expansion turbine's exhaust stream.

10. The method of claim 1, wherein the pressurized steam stream exiting the boiler comprises superheated steam.

11. The method of claim 1, further comprising:
heating a first expanded steam stream exiting the steam turbine to produce a reheated stream of steam at a third temperature and a second pressure below the temperature and pressure operating limits of the boiler;
heating the reheated steam stream by indirect heat exchange with the combustion product gas stream to produce a superheated reheated stream of steam at a fourth temperature above the temperature operating limit of the boiler; and
generating electrical power by passing the superheated reheated steam stream through a second steam turbine driving the electrical generator, the second steam turbine producing a second expanded stream.

12. The method of claim 1, wherein the oxygen and fuel are combusted in a combustion chamber at an elevated pressure within a range from 10 bar to 150 bar.

13. The method of claim 1 for improving performance of an existing power plant for generating electrical power, the power plant comprising the boiler producing the stream of pressurized steam at the first temperature and the first pressure, the pressurized steam stream being fed via an inlet to the steam turbine driving the generator to generate electrical power, the method further comprising:
providing a steam superheater external to the boiler, the steam superheater comprising:
a combustor configured to combust the oxygen and the fuel to produce the combustion product gas stream having the respective temperature higher than the first temperature of the pressurized steam stream, the combustor being configured to recycle a portion of the combustion product gas stream;
connecting the heat exchanger to the boiler to cause the heat exchanger to receive the boiler's pressurized steam stream, the heat exchanger configured to receive the pressurized steam stream and to superheat the pressurized steam stream, by indirect heat exchange with a heat transfer fluid stream, to create the superheated stream of steam at the second temperature above the temperature operating limit of the boiler, the heat exchanger being connected to the combustor to receive the combustion product gas stream as the heat transfer fluid stream;
providing the steam turbine with blades configured for temperature and pressure conditions of the superheated steam stream;
connecting the heat exchanger to the steam turbine's inlet to cause the steam turbine to receive the superheated steam stream to cause the steam turbine to drive the generator to generate electrical power; and
connecting the heat exchanger to a $CO_2$-capture system to cause at least a portion of the combustion product gas stream exiting the heat exchanger to be conveyed to the $CO_2$-capture system, the $CO_2$-capture system being capable of treating the combustion product gas stream and capturing purified $CO_2$.

14. A power plant apparatus for generating electrical power, the apparatus comprising:
a boiler configured to receive boiler feedwater and to produce a pressurized stream of steam at a first temperature and a first pressure below temperature and pressure operating limits of the boiler;
a steam superheater external to the boiler, the steam superheater comprising:
a combustor configured to combust oxygen and fuel to produce a combustion product gas stream having a respective temperature higher than the first temperature; and
a heat exchanger connected to the boiler and the combustor and configured to superheat the pressurized steam stream by indirect heat exchange with the combustion product gas stream to create a superheated pressurized steam stream, the superheated pressurized steam stream comprising steam at a second temperature above the temperature operating limit of the boiler;
a first steam turbine having a steam inlet connected to the heat exchanger to receive and expand the superheated pressurized steam stream to create a first expanded stream and to drive an electrical generator to generate electrical power; and
a $CO_2$-capture system connected to the heat exchanger to cause at least a portion of the combustion product gas stream exiting the heat exchanger to be conveyed to the $CO_2$-capture system, the $CO_2$-capture system being capable of treating the combustion product gas stream and capturing purified $CO_2$.

15. The power plant apparatus of claim 14, wherein the combustor is configured to combust oxygen and fuel mixed with cooled combustion gases recycled from the heat exchanger.

* * * * *